US009117177B1

(12) United States Patent
Carr et al.

(10) Patent No.: US 9,117,177 B1
(45) Date of Patent: Aug. 25, 2015

(54) GENERATING MODULE STUBS (71) Applicant: AMAZON TECHNOLOGIES, INC., Reno, NV (US)

(72) Inventors: Jacob Shannan Carr, Seattle, WA (US); Brian Thomas Kachmarck, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 268 days.

(21) Appl. No.: 13/905,927

(22) Filed: May 30, 2013

(51) Int. Cl.
*G06N 3/08* (2006.01)
*G06F 17/30* (2006.01)
*G06N 3/04* (2006.01)

(52) U.S. Cl.
CPC ............ *G06N 3/08* (2013.01); *G06F 17/30572* (2013.01); *G06N 3/049* (2013.01)

(58) Field of Classification Search
CPC ....... G06N 3/049; G06N 3/02; G06N 99/005; G06N 3/08; G06F 9/44521; G06F 9/44; G06F 11/079; G06F 8/20; G06F 9/46; G06F 17/30572
USPC .............. 706/21; 719/318, 330; 717/106, 154
See application file for complete search history.

(56) References Cited

U.S. PATENT DOCUMENTS 5,740,355 A * 4/1998 Watanabe et al. ................ 714/45
5,960,200 A * 9/1999 Eager et al. .................... 717/147
6,446,137 B1 * 9/2002 Vasudevan et al. ........... 719/330
2003/0056200 A1 * 3/2003 Li et al. .......................... 717/128
2006/0161833 A1 * 7/2006 Chandra et al. ............... 714/763
2007/0016889 A1 * 1/2007 Miyazaki ....................... 717/106
2007/0250363 A1 * 10/2007 Boykin et al. ..................... 705/8
2007/0277158 A1 * 11/2007 Li et al. .......................... 717/135
2008/0184368 A1 * 7/2008 Coon et al. ...................... 726/23
2009/0013334 A1 * 1/2009 Kobylinski et al. ........... 719/318
2009/0024546 A1 * 1/2009 Ficcaglia et al. ................ 706/12
2009/0307654 A1 * 12/2009 Ishikawa et al. .............. 717/106

OTHER PUBLICATIONS

Briand L. et al., "Toward the Reverse Engineering of UML Sequence Diagrams for Distributed Java Software", IEEE Transactions on Software Engineering, vol. 32, No. 9, pp. 642-663, Sep. 2006.*
Briand L. et al., "Towards the Reverse Engineering of UML Sequence Diagrams for Distributed, Multithreaded Java software", Carleton University, TR SCE-04-04, pp. 1-85, Sep. 2004.*

* cited by examiner

*Primary Examiner* — Jeffrey A Gaffin
*Assistant Examiner* — Dave Misir
(74) *Attorney, Agent, or Firm* — Lindauer Law, PLLC (57) ABSTRACT

Sequence diagrams and executable stub modules are generated based on log data associated with a transaction. A sequence diagram generator receives data identifying a relationship between one or more requests and one or more replies stored in the log data. The sequence diagram describes the flow of events of any transaction described by the log data. A stub module comprising executable code in one or more programming languages may be automatically generated using the sequence diagram as input. The stub module may be executed to implement similar functionality of one or more components of the transaction described in the log data.

20 Claims, 8 Drawing Sheets

GENERATING MODULE STUBS

BACKGROUND

Complex systems, such as those used by businesses with an online presence, may involve many different services interacting with one another. As with any large system, various pieces of that system may be changing at any given time. For example, a development team may deploy an update to an existing service. Programming and other development activities are particularly challenging in this type of environment. Documentation for a particular service may be missing or out of date, stubs used during testing may need to be created or updated to reflect changes, and so forth. As a result, developers and system administrators regularly face challenges in maintaining and updating these complex systems.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure relates to automatically generating sequence diagrams and executable stub modules corresponding to at least a portion of the flow of events associated with one or more transactions between applications that may reside on one or more computing devices. An application may comprise a program or group of programs configured to cause, when executed, a computing device to perform one or more tasks. Applications may be hosted by a vendor or service provider and made available to customers over a network. Transactions may include web-services, business transactions, and so forth.

A computing device, such as a server, may access a set of log data associated with a transaction. The log data shows the recorded activity of the events associated with the transaction across two or more computing devices. For example, the log data may comprise a set of data associated with one or more applications, a set of data associated with one or more servers, real-time network traffic data, or other data associated with the transaction. The log data may then be parsed to identify a sequence of requests and replies corresponding to the functionality of the transaction. For example, the log data may contain a series of requests and replies representing a message exchange between two or more servers.

Once the series of requests and replies has been obtained from the log data, data mapping may be used to identify a correspondence or a relationship between one or more of the requests and one or more of the replies based on a set of mapping data. Data mapping is a process in which a relationship between two distinct data elements is defined. Once a correspondence or relationship between the one or more requests and one or more of the replies has been determined, a set of associated data that may comprise pairs of associated requests and replies may be generated. The associated data may then be used to generate a sequence diagram, a stub module, or both.

A sequence diagram is a kind of interaction diagram that shows a flow of events associated with one or more transactions such as, complex operations, functions, procedures, web-services, business transactions, and so forth. A sequence diagram may show object interactions arranged in time sequence. It depicts the objects and classes involved in the scenario and the sequence of messages exchanged between the objects needed to carry out the functionality of the scenario.

Using the sequence diagram, a stub module may then be generated that comprises executable code in one or more programming languages. Stub modules are programs which simulate the behavior of software modules of the transaction. The stub module may be executed to implement similar functionality of one or more components of the transaction. For example, the stub module may simulate responsiveness of the transaction it is patterned after. The stub module may be configured to be executed on one or more stand-alone computing devices or one or more networked computing devices. The stub module may be used for testing, validating, and verifying the functionality of the various components of the transaction.

For example, a transaction may contain modules X, Y, and Z. Module X is ready for testing but calls functions from modules Y and Z. In order to test the X module, stub modules (i.e. small pieces of executable code) which simulate at least some of the functionality of modules Y and Z may be created. These stub modules are then used during testing, in place of the full modules. The stub module may have limited functionality and consumes a smaller number of the system's resources than the actual application.

Illustrative System

Figure 1:
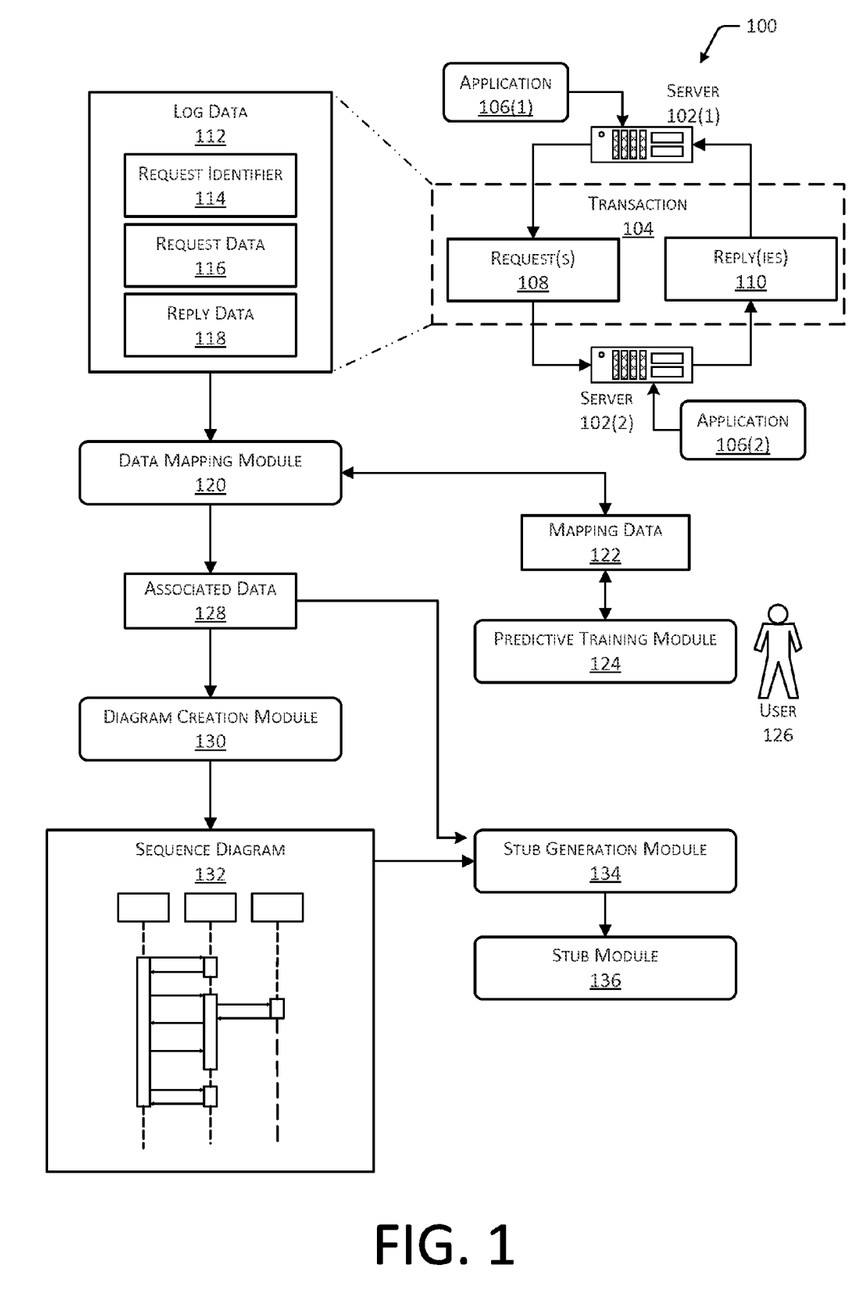
FIG. 1 is an illustrative system for automatically generating sequence diagrams and "stub" executable code modules based at least in part on a series of messages exchanged between computing devices.

FIG. 1 is an illustrative system 100 for automatically generating sequence diagrams and executable code modules based at least in part on a series of messages exchanged between computing devices.

In this illustration, servers 102(1), 102(2) ... 102(S) may be communicatively coupled through a network (not shown). The servers 102(S) may comprise any type of server that contains a processor operable to execute computer executable instructions and a memory to store and retrieve information. In some implementations, the servers 102(S) host an e-commerce web site. The servers 102 comprise one or more applications 106(1), 106(2) ... 106(H). These applications 106(H) may be configured to accept one or more requests 108 and may provide one or more replies 110 responsive to those requests 108. The process of accepting a request 108 or generating a reply 110 may be known as an event. Events may comprise messages or methods invoked by the servers 102 (S), return values (if any) associated with the invoked messages or methods, and so forth. The applications 106 (H) may comprise services, such as a database access service, web page service, and so forth configured to support a number of different events. The events may comprise a series of actions performed by one or more computing devices which are associated with an application 106. For example an event may comprise one or more transactions 104 between the applications 106(1), 106(2) . . . 106(H), with the transactions 104 comprising the requests 108 and the corresponding replies 110.

The servers 102 may be configured to maintain a set of log data 112 listing each of the requests 108 made to the servers 102 and each of the replies 110 made by the servers 102. The log data 112 may comprise a record of the events of a computing device, a software transaction, and so forth. The log data 112 may comprise a request identifier 114, request data 116, reply data 118, and so forth. The request identifier 114 may correspond to a customer, a type of transaction, and so forth. The request identifier 114 may be associated with one or more requests 108, one or more replies 110, and one or more components of the application 106(H). To this end, the log data 112 may include a series of requests 108 and a series of replies 110 representative of a message exchange between the servers 102(S). The log data 112 may also include information relating to multiple components with various functionality of the application 106. Additionally, the log data 112 may comprise information resulting from a combination of multiple log files.

The data mapping module 120 may be configured to parse the information in the log data 112 in order to identify the sequence of events corresponding to the transaction 104. In this respect, the data mapping module 120 may be configured to identify data relationships between one or more of the requests 108 and one or more of the replies 110. As described above, data mapping is a process in which a relationship between the two distinct data elements is defined. The data mapping module 120 may be configured to use a set of mapping data 122 to determine a correspondence or a relationship between the one or more requests 108 and the one or more replies 110. The mapping data 122 may contain information used to define mappings between the one or more requests 108 and the one or more replies 110. The mapping data 122 may include parameters such as, for example, the request identifier 114, a timestamp associated with the one or more requests 108, a timestamp associated with the one or more replies 110, and so forth. Depending on how the mapping data 122 is defined, different results may be achieved by the data mapping module 120.

When ambiguities regarding the relationship between one or more requests 108 and one or more replies 110 exist, a predictive training module 124 may be implemented to predict potential relationships between the one or more requests 108 and the one or more replies 110. The predictive training module 124 may be configured to present future trends, behavior patterns, and so forth. The predictive training module 124 may use input data and output data that mirror the form of actual requests 108 and actual replies 110 that comprise one or more components of the transaction 104. The predictive training module 124 may include a set of rules that define the correspondence between the requests 108 and the replies 110, a set of conditions that when satisfied causes an override of preexisting values, and other machine learning techniques.

The predictive training module 124 may then generate a predictive output identifying potential data relationships between the one or more requests 108 and the one or more replies 110. A confidence level may be associated with the predictive output indicating a measure of reliability of the result. The confidence level may be used to describe a percentage of instances that a set of similarly constructed tests, inputs, actions, messages, events, and so forth will produce the same result as the actual transaction 104. As more constructed tests, inputs, actions, messages, events, and so forth are performed using the predictive training module 124, the predictive output may be predicted with an increased confidence level.

The predictive output may then be presented to a user 126 of a client computing device using a user interface. A client computing device is any device capable of accessing the network (not shown). By way of example only, and not limitation, these devices may include a laptop, a desktop computer, a set-top box, a handheld device such as an electronic book reader, wearable computing device, a cellular phone, smart phone, or a video gaming device. The client computing device includes a form of computer readable media. The computer readable media stores, among other things, applications 106(H) or programs. The client computing device includes user input devices that enable the user 126 to enter information into the client computing device. These include, for example, a keyboard, a pointing device, or an audio input device. The client computing device also includes one or more output devices. These include, for example, a graphical display device or an audio output device.

Stored on the computer readable media on the client computing device is a user interface such as, among other possibilities, a web browser. Web browsers enable users 126 to display and interact with media and other information typically located on a web page or a website on the servers 102(S).

The user 126 of the client computing device may then follow instructions displayed on the user interface to provide a user input indicating an approval or denial of the predictive output generated by the predictive training module 124. To this end, the user 126 enters the user input into the user interface of the client computing device through one of the user input devices. In some implementations, the user input provided by the user 126 may be used to instruct the predictive training module 124 to ignore one or more fields when predicting potential relationships between the one or more requests 108 and the one or more replies 110. For example, the user 126 may provide a predictive profile identifying a collection of fields that are relevant in establishing the potential relationships between the requests 108 and the replies 110 to the predictive training module 124. The predictive profile may also include a collection of fields that the predictive training module 124 may ignore completely. For example, multiple requests 108 having the same or similar functionality may be generated sequentially. The user 126 may provide a user input to the predictive training module 124 to ignore a time field associated with each of the requests 108.

Once the relationships between the one or more requests 108 and the one or more replies 110 have been determined, the system of FIG. 1 generates a set of associated data 128 that may include one or more associated pairs of requests 108 and replies 110. The diagram creation module 130 may be configured to receive as input the associated data 128. Upon receipt of the associated data 128, the diagram creations module 128 may generate a sequence diagram 132 representing a flow of events between the servers 102 (S) corresponding to the transaction 104. Events may comprise messages or methods invoked by the servers 102(S), return values (if any) associated with the invoked messages or methods, and so forth.

In one implementation, a set of associated data 128 may include associated pairs of requests 108 and replies 110 between servers 102(S). The diagram creation module 130 then uses the associated data 128 to generate a sequence diagram 132 representing the exchange of messages between the servers 102(S). To this end, the interaction between the servers 102 (S) is considered a transaction 104. The flow of events associated with the transaction 104 is described in associated data 128 and depicted in the sequence diagram 132.

The sequence diagram 132 may be stored in a computing device or displayed on a computing device. In some implementations, the diagram creation module 130 may generate a sequence diagram 132 to represent the functionality of multiple components of the application 106.

The stub generation module 134 may access the associated data 128, the sequence diagram 132, or both to generate a stub module 136. The stub module 136 may comprise executable code in one or more programming languages. The stub module 136 may be executed to implement similar functionality of one or more components of the application 106. The stub module 136 may be configured to be executed on one or more stand-alone computing devices or one or more networked computing devices. Additionally, the stub module 136 may be used for testing, validating, and verifying the functionality of the various components of the application 106.

Figure 2:
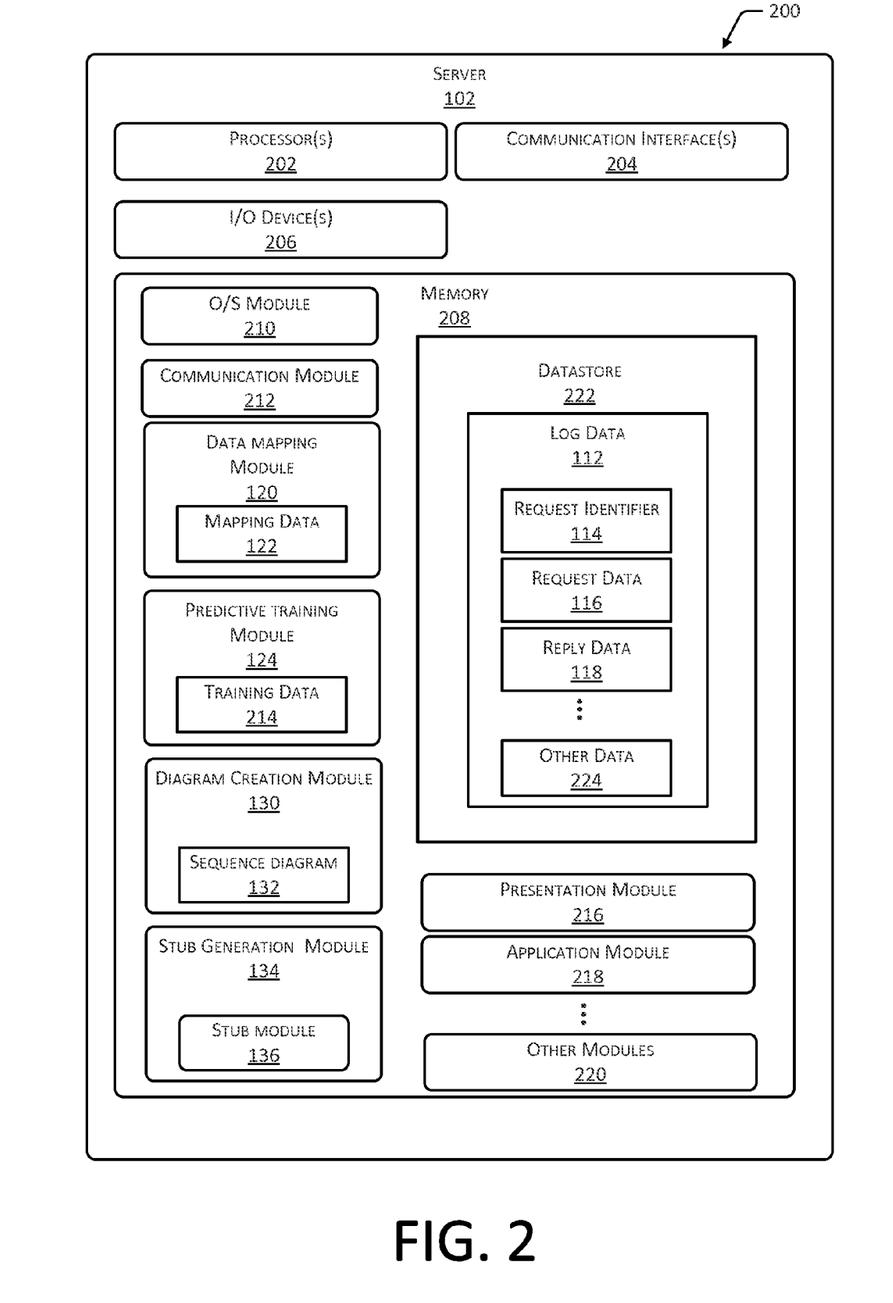
FIG. 2 is a block diagram of a server configured to generate sequence diagrams and stub modules.

FIG. 2 is a block diagram 200 of the server 102. The server 102 may be configured to generate sequence diagrams 132, create stub modules 136, or both.

The server 102 may include one or more processors 202 configured to execute one or more stored instructions. The processors 202 may comprise one or more cores. The server 102 may include one or more communication interfaces 204 to allow the processor 202 or other portions of the server 102, to communicate with other devices.

The communication interfaces 204 are configured to provide communications between two or more servers 102 and other devices, such as, routers, access points, client computing devices, and so forth. The communication interfaces 204 may connect to the network(s), such as personal area networks ("PANs"), wired and wireless local area networks ("LANs"), wide area networks ("WANs"), and so forth. For example, Ethernet, Wi-Fi™, 3G, 4G, and so forth.

The communication interfaces 204 may couple to one or more input/output ("I/O") devices 206. The I/O devices 206 may include one or more displays, haptic output devices, and so forth. The displays may include liquid crystal displays, interferometric displays, electrophoretic displays, electrowetting displays, cholesteric displays, light emitting diode displays, and so forth. In some implementations the displays may also utilize image projection systems having liquid crystal displays, digital micromirror devices, microelectromechanical systems ("MEMs") spatial light modulators, liquid crystal on silicon displays, light emitting diodes, lasers, and so forth.

The I/O devices 206 may be physically incorporated with the server 102 or may be externally placed. The server 102 may also include one or more busses or other internal communications hardware or software that allow for the transfer of data between the various modules and components of the server 102.

As shown in FIG. 2 the server 102 includes one or more memories 208. The memory 208 may comprise one or more computer-readable storage media ("CRSM"). The CRSM may be any one or more of an electronic storage medium, a magnetic storage medium, an optical storage medium, a quantum storage medium, a mechanical computer storage medium and so forth. The memory 208 provides storage of computer readable instructions, data structures, program modules, and other data for the operation of the server 102.

The memory 208 may include at least one operating system ("OS") module 210. The OS module 210 is configured to manage hardware resource devices such as the communication interfaces 204, the I/O devices 206, and provide various services to transactions 104 or modules executing on the processors 202. Also stored in the memory 208 may be one or more of the following modules. These modules may be executed as foreground applications, background tasks, daemons, and so forth.

The communication module 212 is configured to maintain one or more of the communication paths with other devices. The communication module 212 may be configured to send, receive, or send and receive data between the devices.

The data mapping module 120 may be configured to identify data relationships between one or more of the requests 108 and one or more of the replies 110. As described above, data mapping is a process in which two distinct data elements are created and a relationship between two distinct data elements is defined. The data mapping module 120 may be configured to use a set of mapping data 122 to determine a correspondence between the one or more requests 108 and the one or more replies 110. The mapping data 122 may contain information used to define mappings between the one or more requests 108 and the one or more replies 110. The mapping data 122 may include parameters such as, for example, the request identifier 114, a timestamp associated with the one or more requests 108, a timestamp associated with the one or more replies 110, syntactic cues, semantic cues, and so forth. Depending on how the mapping data 122 is defined, different results may be achieved.

The memory 208 may also include a predictive training module 124. The predictive training module 124 may be configured to predict an output from a given input. Predicting an output may include predicting future trends, behavior patterns, and so forth. As described above, the predictive training module 124 may be trained with training data 216 that may include input data and output data that corresponds to the series of requests 108 and replies 110 of the transaction 104. For example, the predictive training module 124 may obtain at least a portion of the request data 116 and at least a portion of the reply data 118 from the log data 112. The predictive training module 124 may then generate a predictive output identifying potential data relationships between the one or more requests 108 and the one or more replies 110. The predictive output may then be presented to a user 126 of a client computing device using a user interface. The user 126 of the client computing device may then follow instructions displayed on the user interface to provide user input indicating an approval or denial of the predictive output generated by the predictive training module 124. For example, a user interface may be presented to a user 126 that includes a series of dialog boxes. The user input provided through the user interface may be used by the predictive training module 124 to predict relationships between the one or more requests 108 and the one or more replies 110.

In response to the user input, the training data 214 may be updated based at least in part on the user input. When the training data 214 is updated, the predictive training module 124 may be retrained to generate a different predictive output according to the updated training data 214. In some implementations, the predictive output generated by the predictive training module 124 may be rated using a confidence level to estimate the accuracy of the generated predictive output. For example, a predictive training module 124 may be trained using a set of training data 214 that includes 100 training samples. The predictive training module 124 may generate 83 correct predictive outputs and 17 incorrect predictive outputs based on the 100 training samples resulting in a confidence level of 83% (eighty-three percent). The training data 214 may then be updated according the user input indicating the predictive training module 124 generated 5 correct predictive outputs and 5 incorrect predictive outputs. The confidence level may then be determined as (83+5)/(100+10)=80% (eighty percent).

The diagram creation module 130 may be configured to receive as input the associated data 128. The diagram creation module 130 may generate a sequence diagram 132 based at least in part on a portion of the associated data 128.

The sequence diagram 132 may comprise data that represents a series of inputs and outputs, messages, transactions, and so forth. Sequence diagrams 132 show how different objects cooperate. To this end, objects are defined, and interactions between objects are represented by a sequence of messages between objects. In one implementation, the sequence diagram 132 may model the flow of logic within the transaction in a graphical manner. The sequence diagram 132 may be stored in a computing device or displayed on a computing device. In some implementations, the diagram creation module 130 may generate a sequence diagram 132 to represent the functionality of each component of the transaction 104. For example, the transaction 104 may comprise a storage component and a routing component. The diagram creation module 130 may generate a sequence diagram 132 corresponding to the storage component of the application 106 and a sequence diagram 132 corresponding to the routing component of the application 106. Additionally, the sequence diagrams 132 may be grouped by the type of sequence represented in each of the sequence diagrams 132. For example, a histogram or equivalent data may be generated to illustrate the frequency of each type of sequence.

The stub generation module 134 may be configured to generate a stub module 136 that corresponds to the sequence diagram 132. A stub module 136 is a piece of code that is used to convert parameters during a remote procedure call ("RPC"). An RPC permits a client computing device to remotely call procedures on a server 102. RPCs may involve a client process and a server process that may be located on different computers.

Stub modules 136 may be generated automatically. To automatically generate a stub module 136, interface description language ("IDL") may be used for defining the interface between the client computing device and a server 102. For example, an interface definition may comprise information to indicate inputs, outputs, or both. Input elements may be passed from the client computing device to the server 102. Output elements may be passed from the server 102 to the client computing device. The stub module 136 may comprise executable code in one or more programming languages including, but not limited to, C, C++, COBOL, Pascal, FORTRAN, Java, JavaScript, Objective C, Python, VBScript, and so forth. The stub module 136 may be executed to implement similar functionality of one or more components of the application 106. The stub module 136 may be configured to be executed on one or more stand-alone computing devices or one or more networked computing devices. Additionally, the stub module 136 may be used for testing, validating, and verifying the functionality of the various components of the application 106.

The presentation module 216 configures the server 102 to present a user interface or other information to a user 126. In some implementations, the server 102 is configured to send information to one or more of the servers 102 for presentation.

The application module 218 may comprise components that represent particular application tasks. For example, the application module 218 may include code, logic, and so forth to implement a particular application task.

Other modules 220 may also be present. These other modules 220 may include, but are not limited to, a classification module that may be configured to automatically sort and classify different types of requests based at least in part on a set of predetermined parameters such as, for example, a transaction type, an item category, and so forth.

The modules of the server 102 are described in this disclosure as separate modules. In some implementations at least a portion of the functionality of these modules may be combined into a single module, or incorporated into another module.

The memory 208 may also include a datastore 222 to store information. The datastore 222 may use a flat file, database, linked list, tree, or other data structure to store the information. In some implementations, the datastore 222 or a portion of the datastore 222 may be distributed across one or more other devices including servers 102, network attached storage devices, and so forth.

The datastore 222 may also store the log data 112 including the request identifier 114, the request data 116, the reply data 118, or a portion thereof, or other data 224. For example, the other data 224 may include communication path parameters, control data, user preferences, user interface elements, and so forth.

Figure 3:
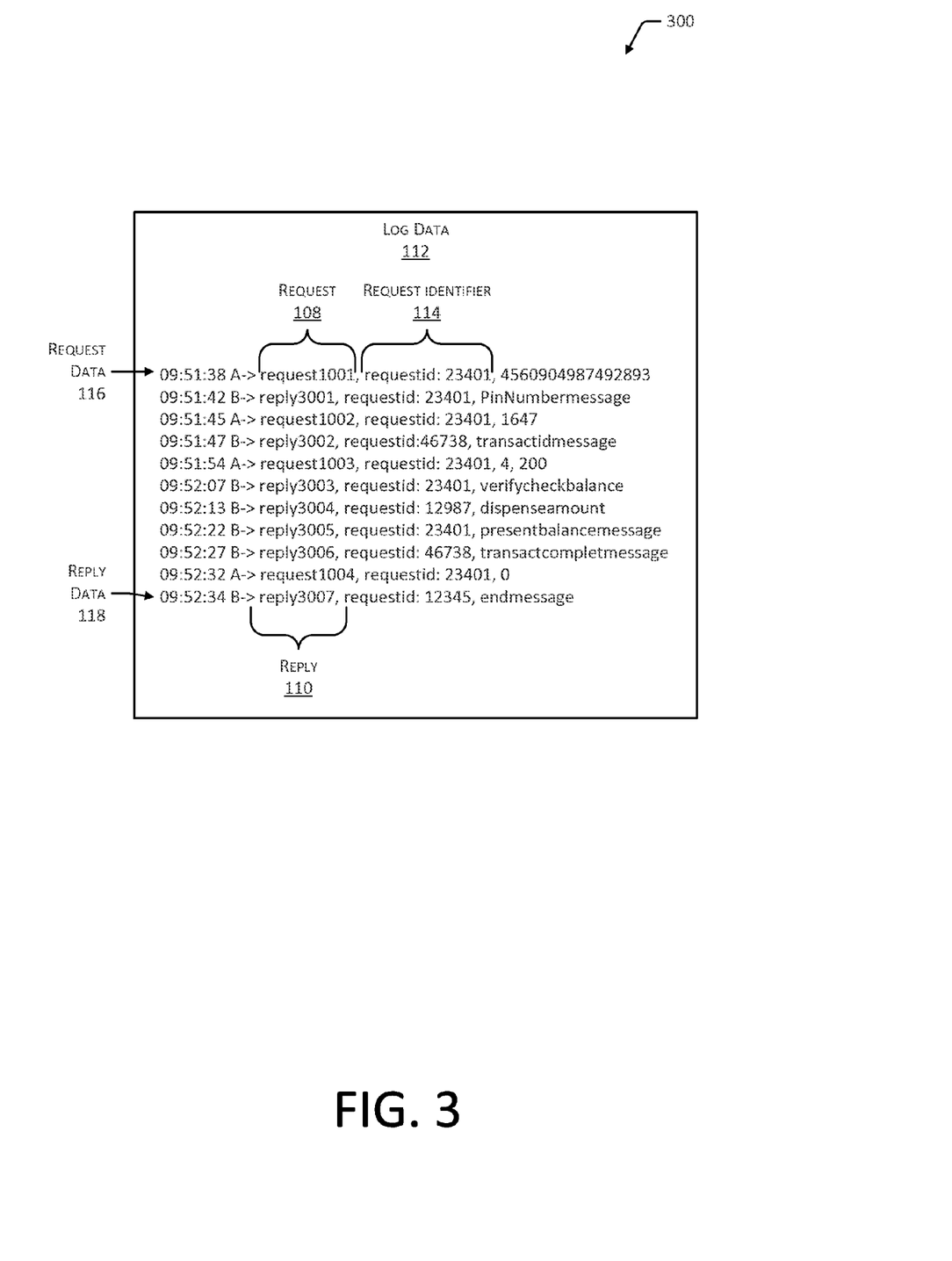
FIG. 3 illustrates a schematic of log data used by the server to generate the sequence diagrams and the stub modules.

FIG. 3 illustrates a schematic 300 of log data 112. The log data 112 may comprise a record of the activities of a computing device, a transaction, and so forth. For example, servers 102 may be configured to maintain a set of log data 112 listing each of the requests 108 made to the server 102 and each of the replies 110 made by the server 102. The log data 112 may comprise a request identifier 114, request data 116, reply data 118 reply data 118, and so forth. To this end, the log data 112 may include a series of requests 108 and a series of replies 110 representative of a message exchange between the servers 102. The log data 112 may also include information relating to multiple components of the transaction 104. Additionally, the log data 112 may comprise information resulting from a combination of multiple log files.

Figure 4:
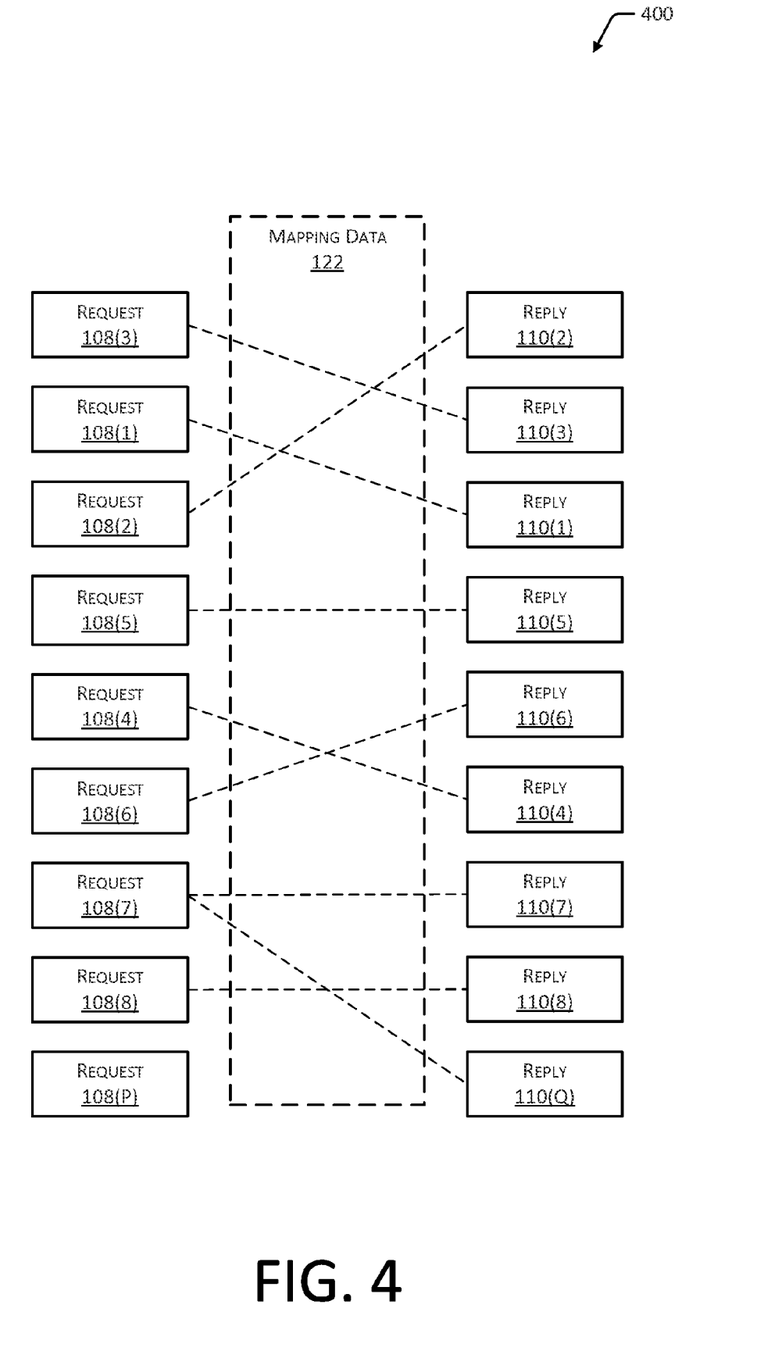
FIG. 4 illustrates a schematic of the series of messages which include requests and replies, and mapping data relating the two.

FIG. 4 illustrates a schematic 400 of the requests 108, the replies 110, and the mapping data 122 relating the two. As described above, the requests 108 and the replies 110 may represent a series of messages passed between servers 102 during the transaction 104.

The mapping data 122 provides a correspondence between one or more of the requests 108 and one or more of the replies 110. In this illustration, the mapping data 122 is represented by the dashed lines which connect one or more of the requests 108 and one or more of the replies 110. The mapping data 122 may include parameters such as, the request identifier 114, a timestamp associated with the one or more requests 108, a timestamp associated with the one or more replies 110, syntactic cues, semantic cues, and so forth. In some implementations, a correspondence between the request 108 and the reply 110 may be created based on the order in which the request 108 and reply 110 were communicated by the servers 102. The requests 108 and the replies 110 may be ordered based on a timestamp, the request identifier 114, a sequence identifier, or other factors. Depending on how the mapping data 122 is defined, different results may be achieved.

Figure 5:
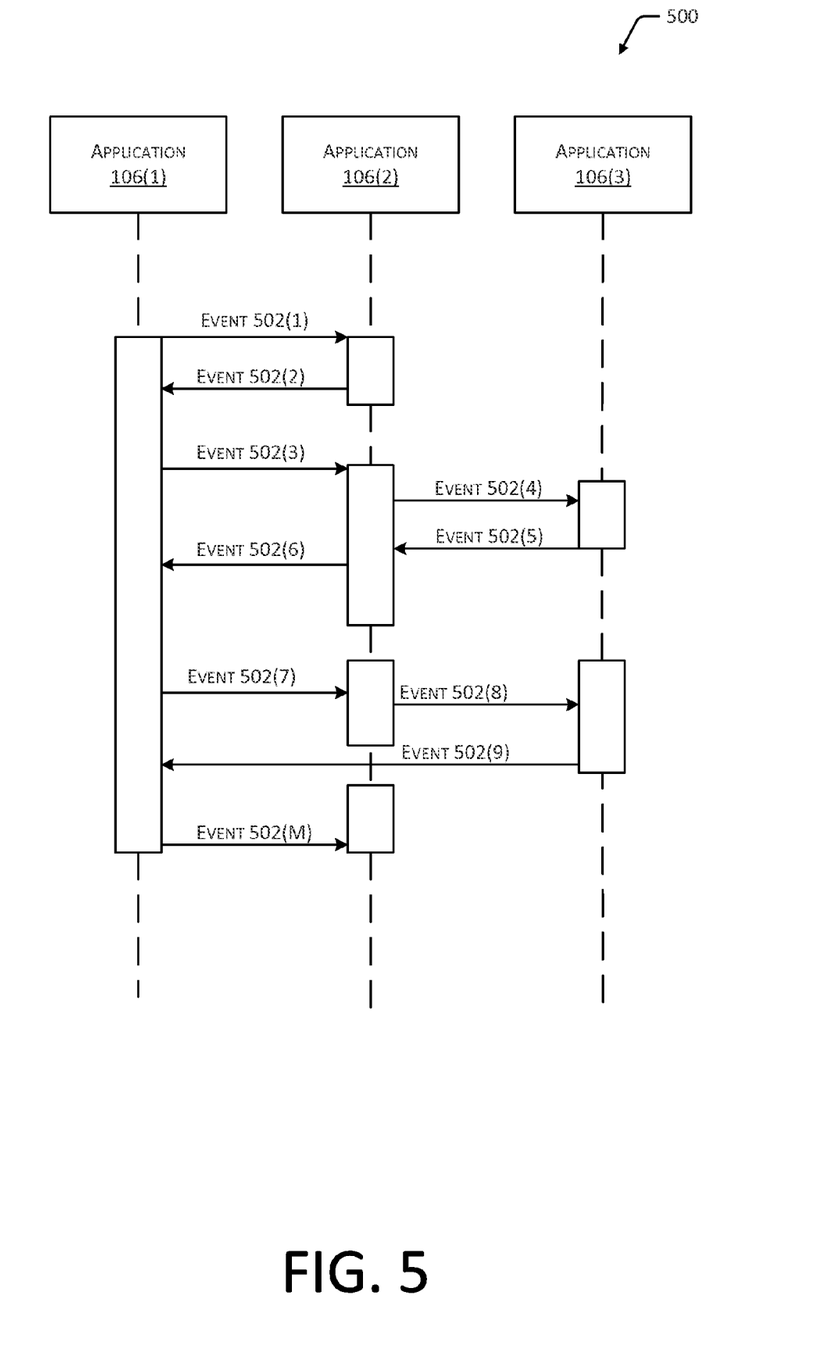
FIG. 5 illustrates a sequence diagram created by the diagram creation module.

FIG. 5 illustrates a schematic 500 of a sequence diagram 132 that may be created by the diagram creation module 130. Sequence diagrams 132 may be used to design, document and validate the architecture, interfaces and logic of a system, a service or a transaction 104 by describing the sequence of actions between the servers 102(S) that need to be performed to complete a transaction 104. Sequence diagrams 132 may provide a view of dynamic behavior of the system, the service, or the transaction 104. The flow of many types of transactions 104 may be represented by the sequence diagram 132.

Sequence diagrams 132 may allow a user 126 to see how tasks are distributed between components. Additionally, sequence diagrams 132 may be used to identify patterns of interaction between the components. To this end, the sequence diagram 132 may depict how the applications 106(H) interact and in what order the interactions between the applications 106(H) occur.

The sequence diagram 132 of FIG. 5 illustrates the interactions between applications 106(1), 106(2), and 106(3). Events 502(1)-(M) indicating a series of messages, methods, actions, or steps performed by the applications 106(H) are depicted with lines that extend from one application 106(H) to another application 106(H). The events 502(M) may show the interactions between the applications 106(H) for a given transaction 104. For example, a respective one of the applications 106(H) may request a login. The login request may be represented as an event 502(M) labeled "username, password". After each event 502 is performed, a response or next event is depicted under the previous event 502 to illustrate the series of interactions between the applications 106(H) over a period of time.

The sequence diagram 132 may be created to provide a graphical representation of the flow of events of one or more of the components of the application 106(H) associated with the log data 112. In this illustration, the sequence diagram 132 depicts a series of events 502(M) associated with the transaction 104 between the applications 106(H). The sequence diagram 132 may represent the functionality of one or more components of the application 106(H).

Figure 6:
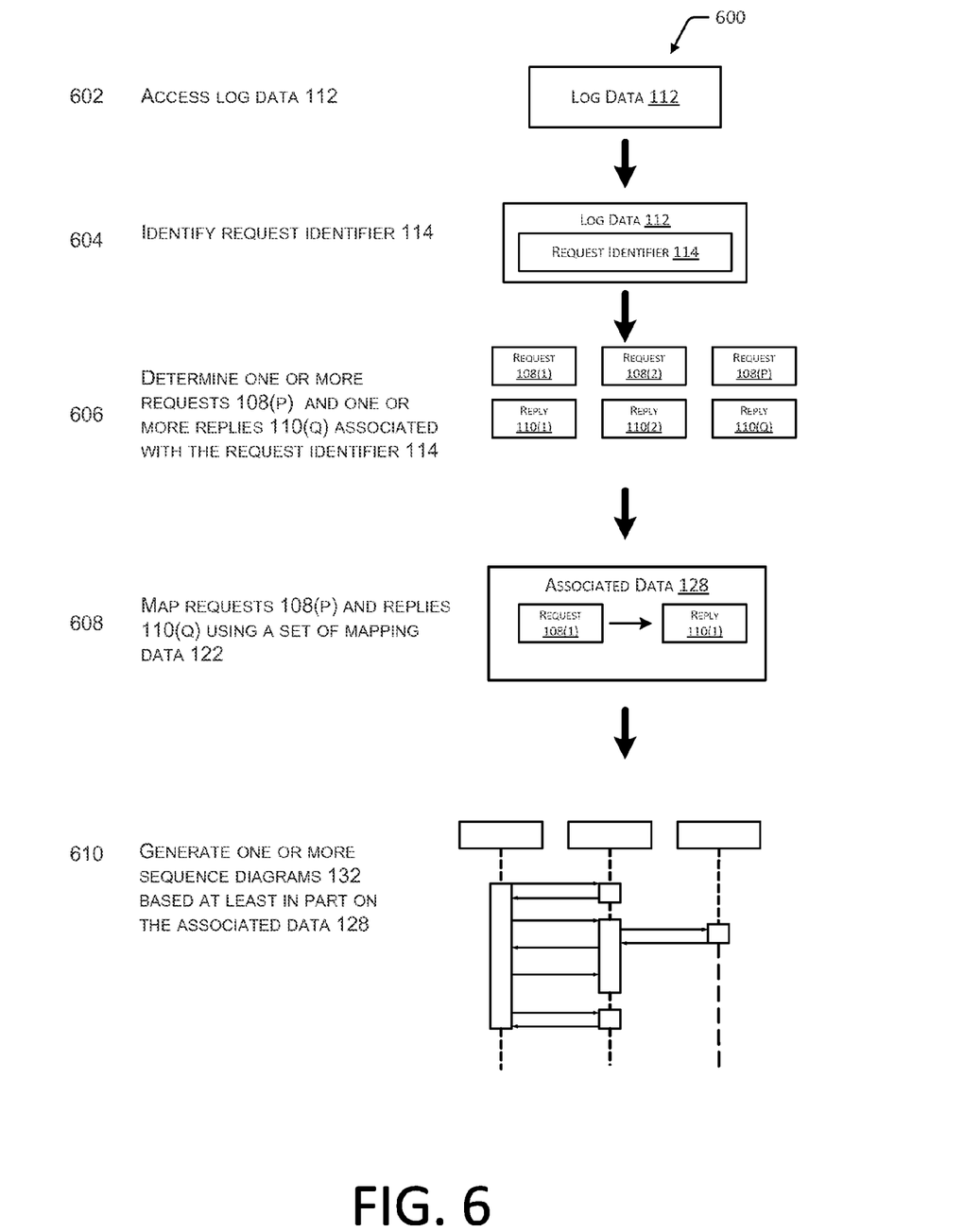
FIG. 6 illustrates the operations of mapping a series of requests and a series of replies based at least in part on the request identifier and generating a sequence diagram representing a flow of events associated with one or more transactions between applications that may reside on a server.

FIG. 6 illustrates the operations 600 of mapping a series of requests 108 and a series of replies 110 based at least in part on the request identifier 114 and generating a sequence diagram 132 representing a flow of events of the transaction 104. These operations may be performed at least in part by the servers 102(S) described above.

At 602, the log data 112 is accessed. For example, the log data 112 may be retrieved from a datastore 220. At 604, the request identifier 114 is identified in the log data 112. As described above, the request identifier 114 may correspond to a customer, a type of transaction, and so forth. The request identifier 114 may be associated with one or more requests 108, replies 110, or components of the transaction 104.

At 606, one or more requests 108(N) and one or more replies 110(P) associated with the request identifier 114 are determined. At 608, a series of requests 108(N) and a series of replies 110(P) are mapped using a set of mapping data 122 to establish a correspondence or relationship between the requests 108(N) and the replies 110(P). The mapping data 122 may include parameters such as, the request identifier 114, a timestamp associated with the one or more requests 108(N), a timestamp associated with the one or more replies 110(P), syntactic cues, semantic cues, and so forth. Once the relationships between the one or more requests 108 and the one or more replies 110 have been determined, a set of associated data 128 may be generated that may include one or more associated pairs of requests 108 and replies 110.

At 610, at least a portion of the associated data 128 may be used generate a sequence diagram 132 representing the exchange of messages between the servers 102(S). To this end, the interaction between the servers 102 is considered a transaction 104. The flow of events associated with the transaction 104 is described in associated data 128 and depicted in the sequence diagram 132.

Figure 7:
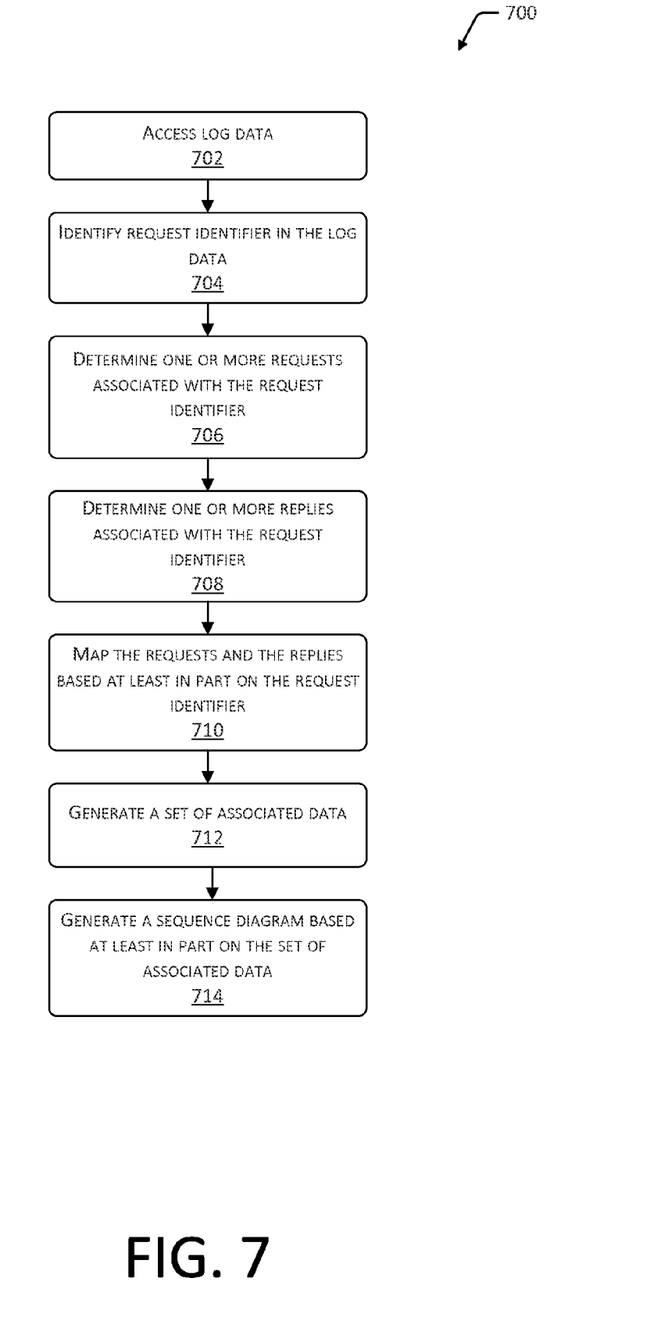
FIG. 7 is a flow diagram of a process of generating a sequence diagram and a stub module.

FIG. 7 is a flow diagram 700 of a process of generating a sequence diagram 132 and a stub module 136. The process may be generated by a server 102 described above.

At block 702, the log data 112 is accessed. For example, the log data 112 may be retrieved from a datastore 220. At block 704, the request identifier 114 is identified in the log data 112. As described above, the request identifier 114 may correspond to a customer, a type of transaction, and so forth. The request identifier 114 may be associated with one or more requests 108, one or more replies 110, and one or more components of the transaction 104.

At block 706, one or more requests 108 associated with the request identifier 114 are determined. At block 708, one or more replies 110 associated with the request identifier 114 are determined.

At block 710, a series of requests 108 and a series of replies 110 are mapped using the request identifier 114 to establish a correspondence or relationship between the requests 108 and the replies 110. Block 712 generates a set of associated data 128 that may include one or more associated pairs of requests 108 and replies 110.

At block 714, at least a portion of the associated data 128 may be used to generate a sequence diagram 132 representing the exchange of messages between the servers 102. The flow of events associated with the transaction 104 is described in associated data 128 and depicted in the sequence diagram 132.

Alternatively, in some implementations, the stub generation module 134 may be configured to accept the sequence diagram 132 and generate a stub module 136 that corresponds to the sequence diagram 132. The stub module 136 may be executed to implement similar functionality of one or more components of the application 106. In some implementations, multiple stub modules 136 may be configured to be integrated in order to create a mock version of the application 106.

Figure 8:
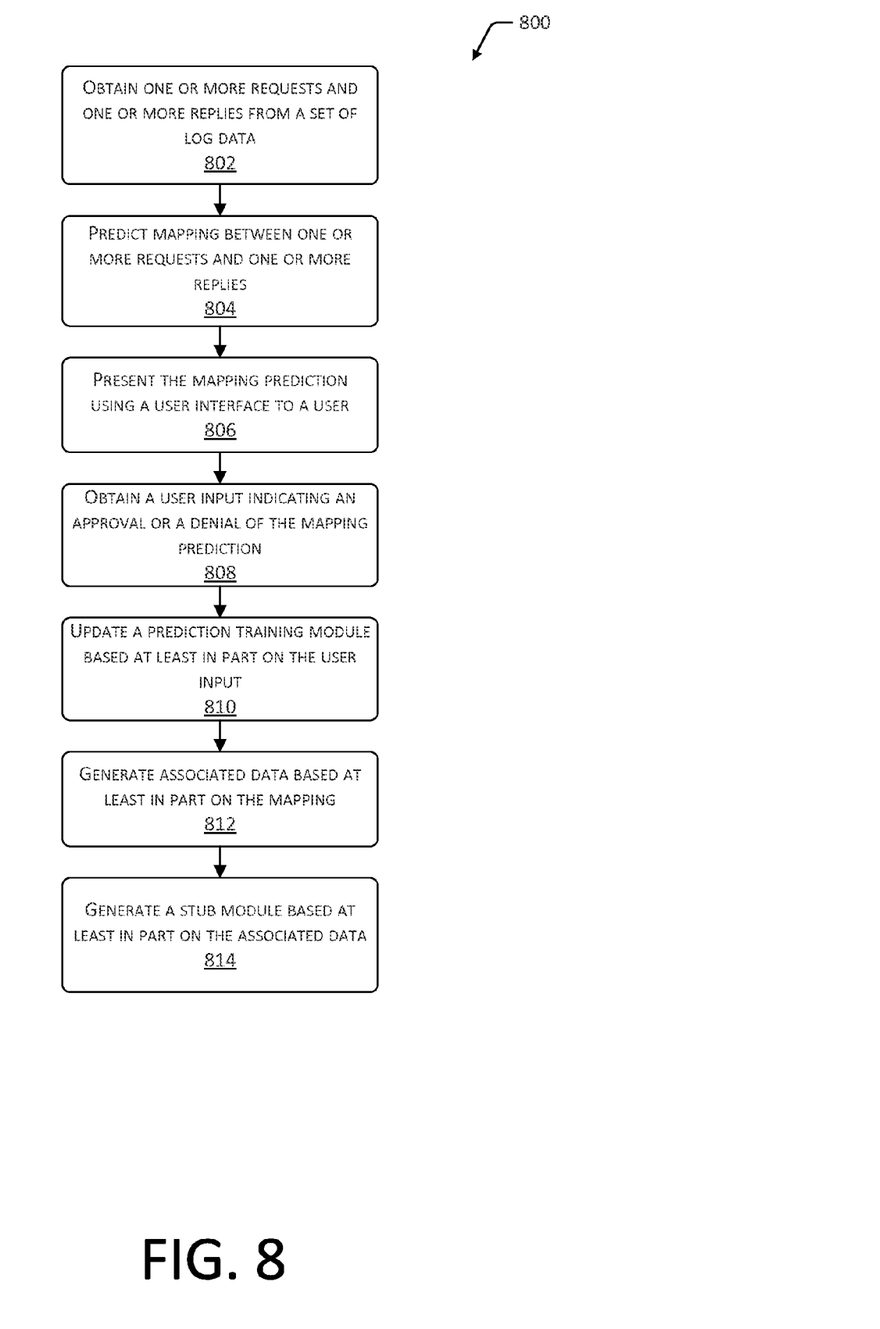
FIG. 8 is a flow diagram of a process of using a predictive training module to generate associated data used to create a sequence diagram and a stub module.

FIG. 8 is a flow diagram 800 of a process of using a predictive training module 124 to generate associated data 128 to create a sequence diagram 132 and a stub module 136. The process may be implemented by the server 102 described above.

Block 802 obtains one or more requests 108 and one or more replies 110 from a set of log data 112. Block 804 predicts a mapping between the one or more requests 108 and the one or more replies 110. Predicting a mapping may include predicting future trends, behavior patterns, and so forth. For example, the predictive training module 124 may obtain at least a portion of the request data 116 and at least a portion of the reply data 118 from the log data 112. The predictive training module 124 may then generate a mapping prediction identifying potential data relationships between the one or more requests 108 and the one or more replies 110. As described above, the predictive training module 124 may be trained with training data 214. The training data 214 may include input data and output data that mirror the form of input data and output data generated by the applications 106(H). In some implementations, the training data 214 may be generated manually or using machine learning techniques.

For example, the training data 214 may be generated after using machine learning techniques such as a neural network or a Bayesian network.

At block 806, the mapping prediction may then be presented to a user 126 of a client computing device using a user interface. At block 808, the user 126 of the client computing device may then follow instructions displayed on the user interface to provide a user input indicating an approval or denial of the predictive output generated by the predictive training module 124.

At block 810, in response to the user input, the predictive training module 124 may be updated based at least in part on the user input. Block 812 generates a set of associated data 128 that may include one or more associated pairs of requests 108 and replies 110.

Block 814 generates a stub module 136 based at least in part on the associated data 128. The stub module 136 may be executed to implement similar functionality of one or more components of the application 106. In some implementations; multiple stub modules 136 may be configured to be integrated in order to create a mock version of the transaction 104. To this end, multiple stub modules 136 may be integrated to ensure that the integrated stub modules 136 interface properly and function similar to the corresponding components of the transaction 104.

Alternatively, in some implementations, at least a portion of the associated data 128 may be used to generate a sequence diagram 132 representing the exchange of messages between the servers 102. The flow of events associated with the transaction 104 is described in associated data 128 may be depicted in the sequence diagram 132. In other implementations, the stub generation module 134 may be configured to accept the sequence diagram 132 and generate a stub module 136 that corresponds to the sequence diagram 132.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations.

Although the present disclosure is written with respect to specific embodiments and implementations, various changes and modifications may be suggested to one skilled in the art and it is intended that the present disclosure encompass such changes and modifications that fall within the scope of the appended claims.

The invention claimed is:

1. A non-transitory computer-readable medium storing instructions, which when executed by a processor, cause the processor to perform actions comprising:
   accessing log data associated with an application;
   identifying one or more requests in the log data;
   identifying one or more replies in the log data;
   determining a mapping prediction between the one or more requests and the one or more replies, wherein the mapping prediction is based at least in part on a set of training data;
   receiving a user input indicative of an approval or a denial of the determined mapping prediction;
   updating the mapping prediction based at least in part on the user input;
   generating a sequence diagram based at least in part on the updated mapping prediction, wherein the sequence diagram indicates a flow of a plurality of events corresponding to a series of actions performed by one or more computing devices associated with the application; and
   generating a stub module based at least in part on the sequence diagram, wherein the stub module corresponds to a component of the application.

2. The non-transitory computer-readable medium of claim 1, further comprising:
   determining a confidence level associated with the mapping prediction, wherein the confidence level is indicative of an estimate of an accuracy of the mapping prediction.

3. The non-transitory computer-readable medium of claim 1, further comprising:
   a predictive training module, wherein the predictive training module is configured to generate the mapping prediction.

4. A system comprising:
   at least one processor;
   at least one memory coupled to the at least one processor and storing instructions configured for execution on the at least one processor, the instructions configured to:
   access a set of log data, wherein the set of log data is associated with an application;
   determine a request identifier in the set of log data;
   identify one or more requests in the set of log data, wherein the one or more requests are associated with the request identifier;
   identify one or more replies in the set of log data, wherein the one or more replies are associated with the request identifier;
   map the one or more requests to the one or more replies based at least in part on the request identifier;
   generate a sequence diagram based at least in part on the mapping, wherein the sequence diagram indicates a flow of a plurality of events associated with the application; and
   generate a stub module based at least in part on the sequence diagram, wherein the stub module corresponds to a component of the application.

5. The system of claim 4, wherein the plurality of events comprises one or more of the following:
   a series of messages invoked by a server, wherein the series of messages are associated with the application; or
   a return value associated with the series of invoked messages.

6. The system of claim 4, further comprising instructions configured to group a plurality of requests based at least in part on one or more of the following:
   the request identifier;
   an entity name;
   a transaction type; or
   an item type.

7. The system of claim 4, further comprising instructions configured to group a plurality of replies based at least in part on one or more of the following:
   the request identifier;

an entity name;
a transaction type; or
an item type.

8. The system of claim 4, wherein the log data comprises one or more of the following:
a data set associated with one or more applications;
a data set associated with one or more servers; or
a set of network traffic data.

9. The system of claim 4, wherein the set of log data comprises a plurality of request identifiers and wherein the sequence diagram is generated for a respective one of the request identifiers.

10. The system of claim 4, wherein the mapping is based at least in part on a set of mapping data comprising one or more of the following:
the request identifier;
a timestamp associated with the one or more requests; or
a timestamp associated with the one or more replies.

11. The system of claim 4, further comprising instructions configured to: generate a graphical representation of the sequence diagram.

12. A computer implemented method comprising:
obtaining one or more requests from a set of log data, wherein the log data is associated with an application;
obtaining one or more replies from the set of log data;
determining a mapping prediction between the one or more requests and the one or more replies based at least in part on a set of training data, wherein the mapping prediction identifies potential relationships between the one or more requests and the one or more replies;
generating a sequence diagram based at least in part on the mapping prediction, wherein the sequence diagram indicates a flow of a plurality of events corresponding to a series of actions associated with the application; and
generating a stub module based at least in part on the sequence diagram, wherein the stub module corresponds to a component of the application.

13. The computer implemented method of claim 12, further comprising:
a predictive training module, wherein the predictive training module is configured to generate the mapping prediction based at least in part on a set of rules that define a relationship between the request and the reply.

14. The computer implemented method of claim 13, further comprising:
updating the predictive training module based on least in part on a user input.

15. The computer implemented method of claim 12, further comprising:
determining a confidence level associated with the mapping prediction.

16. The computer implemented method of claim 15, further comprising:
updating the confidence level based at least in part on a user input.

17. The computer implemented method of claim 16, further comprising:
determining a different mapping prediction responsive to an update to the confidence level.

18. The computer implemented method of claim 12, further comprising:
integrating one or more stub modules into a mock version of the application, wherein the mock version of the application is configured to test a functionality of a plurality of components of the application.

19. The computer implemented method of claim 12, wherein the set of log data comprises a plurality of requests and a plurality of replies from a plurality of applications.

20. The computer implemented method of claim 12, further comprising:
obtaining one or more requests and obtaining one or more replies from multiple sets of log data.

\* \* \* \* \*